United States Patent
Tamagawa

(10) Patent No.: US 9,612,780 B2
(45) Date of Patent: Apr. 4, 2017

(54) SYSTEM FOR UTILIZING A CACHE EFFECTIVELY

(71) Applicant: CANON KABUSHIKI KAISHA, Tokyo (JP)

(72) Inventor: Kei Tamagawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/960,635

(22) Filed: Dec. 7, 2015

(65) Prior Publication Data

US 2016/0162223 A1 Jun. 9, 2016

(30) Foreign Application Priority Data

Dec. 9, 2014 (JP) .................. 2014-249046

(51) Int. Cl.
*G06F 3/12* (2006.01)
*G06K 15/02* (2006.01)

(52) U.S. Cl.
CPC .......... *G06F 3/1213* (2013.01); *G06F 3/1243* (2013.01); *G06F 3/1286* (2013.01); *G06K 15/181* (2013.01); *G06K 15/1886* (2013.01); *G06K 15/1893* (2013.01); *G06K 15/1815* (2013.01)

(58) Field of Classification Search
CPC .................................. G06F 3/1213
USPC ........................................ 358/1.15
See application file for complete search history.

(56) References Cited

U.S. PATENT DOCUMENTS

| 6,049,390 A | * | 4/2000 | Notredame | G06K 15/00 358/1.15 |
| 2002/0196468 A1 | * | 12/2002 | Klassen | G06F 3/122 358/1.18 |
| 2011/0194142 A1 | * | 8/2011 | Wakana | G06K 15/1856 358/1.15 |

FOREIGN PATENT DOCUMENTS

JP H8022426 A 1/1996

* cited by examiner

*Primary Examiner* — Jacky X Zheng
(74) *Attorney, Agent, or Firm* — Carter, DeLuca, Farrell & Schmidt, LLP

(57) ABSTRACT

An information processing system of the present invention includes a data generation device that generates variable data, and a rendering device that performs rendering of the variable data. A first data storing unit of the data generation device stores, as a first correspondence relationship, the generated variable data and identification information for identifying the variable data in association with each other, and a first data management unit manages the first correspondence relationship based on a predetermined management scheme. A cache search unit searches for predetermined variable data from the first correspondence relationship, and a cache hit determination unit determines that rendering data obtained by performing rendering on the variable data is cached when there is predetermined variable data in the first correspondence relationship.

10 Claims, 19 Drawing Sheets

FIG. 8A

| Input variable data |
|---|
| |

| Search start node |
|---|
| A |

| Node name | File name | Identification information | Data specifying information | Sequence deletion number |
|---|---|---|---|---|
| A | | 1 | | 1 |
| B | | 2 | | |
| C | | 3 | | |

| Identification information | Address | Rendered variable data |
|---|---|---|
| 1 | | |
| 2 | | |
| 3 | | |

FIG. 8B

| Input variable data |
|---|
| A.jpg |

| Search start node |
|---|
| A |

| Node name | File name | Identification information | Data specifying information | Sequence deletion number |
|---|---|---|---|---|
| A | A.jpg | 1 | A.jpg | 1 |
| B | B.jpg | 2 | | |
| C | | 3 | | |

| Identification information | Address | Rendered variable data |
|---|---|---|
| 1 | 100 | RA.dat |
| 2 | | |
| 3 | | |

FIG. 8C

| Input variable data |
|---|
| B.jpg |

| Search start node |
|---|
| A |

| Node name | File name | Identification information | Data specifying information | Sequence deletion number |
|---|---|---|---|---|
| A | A.jpg | 1 | B.jpg | 1 |
| B | B.jpg | 2 | | |
| C | | 3 | | |

| Identification information | Address | Rendered variable data |
|---|---|---|
| 1 | 100 | RA.dat |
| 2 | 200 | RB.dat |
| 3 | | |

FIG. 9A

| Input variable data |
|---|
| C.jpg |

| Search start node |
|---|
| A |

| Node name | File name | Identification information | Data specifying information | Sequence deletion number |
|---|---|---|---|---|
| A | A.jpg | 1 | C.jpg | 1 |
| B | B.jpg | 2 | | |
| C | C.jpg | 3 | | |

| Identification information | Address | Rendered variable data |
|---|---|---|
| 1 | 100 | RA.dat |
| 2 | 200 | RB.dat |
| 3 | 300 | RC.dat |

FIG. 9B

| Input variable data |
|---|
| A.jpg |

| Search start node |
|---|
| A |

| Node name | File name | Identification information | Data specifying information | Sequence deletion number |
|---|---|---|---|---|
| A | A.jpg | 1 | 1 | 1 |
| B | B.jpg | 2 | | |
| C | C.jpg | 3 | | |

| Identification information | Address | Rendered variable data |
|---|---|---|
| 1 | 100 | RA.dat |
| 2 | 200 | RB.dat |
| 3 | 300 | RC.dat |

FIG. 9C

| Input variable data |
|---|
| D.jpg |

| Search start node |
|---|
| B |

| Node name | File name | Identification information | Data specifying information | Sequence deletion number |
|---|---|---|---|---|
| A | D.jpg | 1 | D.jpg | 2 |
| B | B.jpg | 2 | | |
| C | C.jpg | 3 | | |

| Identification information | Address | Rendered variable data |
|---|---|---|
| 1 | 400 | |
| 2 | 200 | RB.dat |
| 3 | 300 | RC.dat |
| | 400 | RD.dat |

FIG. 12A

| Input variable data | Number | File name | Identification information | Number of references | | Data specifying information | Identification information | Address | Number of references | Rendered print data |
|---|---|---|---|---|---|---|---|---|---|---|
| | 1 | | 1 | 0 | | | 1 | | 0 | |
| | 2 | | 2 | 0 | | | 2 | | 0 | |
| | 3 | | 3 | 0 | | | 3 | | 0 | |

FIG. 12B

| Input variable data | Number | File name | Identification information | Number of references | | Data specifying information | Identification information | Address | Number of references | Rendered print data |
|---|---|---|---|---|---|---|---|---|---|---|
| A.jpg | 1 | A.jpg | 1 | 1 | | A.jpg | 1 | 100 | 1 | RA.dat |
| | 2 | | 2 | 0 | | | 2 | | 0 | |
| | 3 | | 3 | 0 | | | 3 | | 0 | |

FIG. 12C

| Input variable data | Number | File name | Identification information | Number of references | | Data specifying information | Identification information | Address | Number of references | Rendered print data |
|---|---|---|---|---|---|---|---|---|---|---|
| B.jpg | 1 | A.jpg | 1 | 1 | | B.jpg | 1 | 100 | 1 | RA.dat |
| | 2 | B.jpg | 2 | 1 | | | 2 | 200 | 1 | RB.dat |
| | 3 | | 3 | 0 | | | 3 | | 0 | |

FIG. 13A

| Input variable data |
|---|
| C.jpg |

| Number | File name | Identification information | Number of references |
|---|---|---|---|
| 1 | A.jpg | 1 | 1 |
| 2 | B.jpg | 2 | 1 |
| 3 | C.jpg | 3 | 1 |

| Data specifying information |
|---|
| C.jpg |

| Identification information | Address | Number of references | Address | Rendered print data |
|---|---|---|---|---|
| 1 | 100 | 1 | 100 | RA.dat |
| 2 | 200 | 1 | 200 | RB.dat |
| 3 | 300 | 1 | 300 | RD.dat |

FIG. 13B

| Input variable data |
|---|
| A.jpg |

| Number | File name | Identification information | Number of references |
|---|---|---|---|
| 1 | A.jpg | 1 | 2 |
| 2 | B.jpg | 2 | 1 |
| 3 | C.jpg | 3 | 1 |

| Data specifying information |
|---|
| 1 |

| Identification information | Address | Number of references | Address | Rendered print data |
|---|---|---|---|---|
| 1 | 100 | 2 | 100 | RA.dat |
| 2 | 200 | 1 | 200 | RB.dat |
| 3 | 300 | 1 | 300 | RD.dat |

FIG. 13C

| Input variable data |
|---|
| D.jpg |

| Number | File name | Identification information | Number of references |
|---|---|---|---|
| 1 | A.jpg | 1 | 2 |
| 2 | D.jpg | 2 | 1 |
| 3 | C.jpg | 3 | 1 |

| Data specifying information |
|---|
| D.jpg |

| Identification information | Address | Number of references | Address | Rendered print data |
|---|---|---|---|---|
| 1 | 100 | 2 | 100 | RA.dat |
| 2 | 400 | 1 | 300 | RC.dat |
| 3 | 300 | 1 | 400 | RD.dat |

FIG. 15A

| Input variable data |
|---|
| |

| Search start node |
|---|
| A |

| Node name | File name | Identification information | JobID |
|---|---|---|---|
| A | | 1 | |
| B | | 2 | |
| C | | 3 | |

| Data specifying information | Sequence deletion number |
|---|---|
| | |

| Identification information | Address | JobID | Rendered print data |
|---|---|---|---|
| 1 | | | |
| 2 | | | |
| 3 | | | |

FIG. 15B

| Input variable data |
|---|
| A.jpg |

| Search start node |
|---|
| A |

| Node name | File name | Identification information | JobID |
|---|---|---|---|
| A | A.jpg | 1 | J1 |
| B | | 2 | |
| C | | 3 | |

| Data specifying information | Sequence deletion number |
|---|---|
| A.jpg | 1 |

| Identification information | Address | JobID | Rendered print data |
|---|---|---|---|
| 1 | 100 | J1 | RA.dat |
| 2 | | | |
| 3 | | | |

FIG. 15C

| Input variable data |
|---|
| B.jpg |

| Search start node |
|---|
| A |

| Node name | File name | Identification information | JobID |
|---|---|---|---|
| A | A.jpg | 1 | J1 |
| B | B.jpg | 2 | J2 |
| C | | 3 | |

| Data specifying information | Sequence deletion number |
|---|---|
| B.jpg | 1 |

| Identification information | Address | JobID | Rendered print data |
|---|---|---|---|
| 1 | 100 | J1 | RA.dat |
| 2 | 200 | J2 | RB.dat |
| 3 | | | |

FIG. 15D

| Input variable data |
|---|
| C.jpg |

| Search start node |
|---|
| A |

| Node name | File name | Identification information | JobID |
|---|---|---|---|
| A | A.jpg | 1 | J1 |
| B | B.jpg | 2 | J2 |
| C | C.jpg | 3 | J3 |

| Data specifying information | Sequence deletion number |
|---|---|
| C.jpg | 1 |

| Identification information | Address | JobID | Rendered print data |
|---|---|---|---|
| 1 | 100 | J1 | RA.dat |
| 2 | 200 | J2 | RB.dat |
| 3 | 300 | J3 | RC.dat |

FIG. 16A

| Input variable data |
|---|
| A.jpg |

| Search start node |
|---|
| B |

| Node name | File name | Identification information | JobID |
|---|---|---|---|
| A | A.jpg | 1 | J4 |
| B | B.jpg | 2 | J2 |
| C | C.jpg | 3 | J3 |

| Data specifying information | Sequence deletion number |
|---|---|
| 1 | 2 |

| Identification information | Address | JobID |
|---|---|---|
| 1 | 100 | J4 |
| 2 | 200 | J2 |
| 3 | 300 | J3 |

| Address | Rendered print data |
|---|---|
| 100 | RA.dat |
| 200 | RB.dat |
| 300 | RC.dat |

FIG. 16B

| Input variable data |
|---|
| D.jpg |

| Search start node |
|---|
| C |

| Node name | File name | Identification information | JobID |
|---|---|---|---|
| A | A.jpg | 1 | J4 |
| B | D.jpg | 2 | J5 |
| C | C.jpg | 3 | J3 |

| Data specifying information | Sequence deletion number |
|---|---|
| D.jpg | 3 |

| Identification information | Address | JobID |
|---|---|---|
| 1 | 100 | J4 |
| 2 | 400 | J5 |
| 3 | 300 | J3 |

| Address | Rendered print data |
|---|---|
| 100 | RA.dat |
| 300 | RC.dat |
| 400 | RD.dat |

FIG. 16C

| Input variable data |
|---|
| A.jpg |

| Search start node |
|---|
| B |

| Node name | File name | Identification information | JobID |
|---|---|---|---|
| A | A.jpg | 1 | J6 |
| B | D.jpg | 2 | J5 |
| C | | 3 | |

| Data specifying information | Sequence deletion number |
|---|---|
| 1 | 2 |

| Identification information | Address | JobID |
|---|---|---|
| 1 | 100 | J6 |
| 2 | 400 | J5 |
| 3 | | |

| Address | Rendered print data |
|---|---|
| 100 | RA.dat |
| 400 | RD.dat |

SYSTEM FOR UTILIZING A CACHE EFFECTIVELY

BACKGROUND OF THE INVENTION

Field of the Invention

The present invention relates to an information processing system.

Description of the Related Art

Conventionally, variable printing in which content is replaced on each printed page using data (variable data) in which content is individually changed, such as data in a database, while a layout of text or figures stays the same is known in the commercial printing industry.

Since personal information is often handled in variable printing, it is necessary to secure a high degree of confidentiality. When data to be printed is developed on a memory of a server, the data is highly likely to be stolen from content of the memory if the server is infiltrated. That is, depending on characteristics of information to be handled, it may not be preferable for the data to be stored on the memory of the server for a long period of time.

Meanwhile, in variable printing, print content is changed according to the data of the database. Accordingly, for example, in the medical field, there are methods of usage in which a dose and usage instructions of a drug are printed on a drug label for each patient. In this case, a variable printing system is arranged in a drug factory as a part of a drug production line, and printing is performed according to a production speed of the production line. In such a case, high-speed printing is required of the variable printing system.

In variable printing in which confidentiality is required, the time it takes from reading of print target identification information for identifying each piece of printed materials in a print target identification information reading device, such as a barcode reader or an IC reader, to printing is very short.

Japanese Patent Laid-Open No. H08-022426 discloses that a management node acquires all key data from a managed node prior to acquisition of a record from the managed node in each of nodes constituting a network system. Further, Japanese Patent Laid-Open No. H08-022426 discloses that the management node selects desired key data, transfers the key data to the managed node, and acquires data corresponding to the key data.

However, in Japanese Patent Laid-Open No. H08-022426, when a change, such as addition or deletion, in data in a list of key data managed by the managed node occurs, it is necessary to notify the management node of the change. In Japanese Patent Laid-Open No. H08-022426, in order for all of the key data to be passed along, the key data is passed along every time a change in the list of the key data occurs. Therefore, when the list of key data is changed frequently, a large amount of CPU resources is consumed. That is, since the CPU resources are consumed for search or matching of the key data, there is no choice but for the CPU resources to be consumed in processes other than the rendering process in the variable printing.

Further, in variable printing, a configuration including a device that generates variable data and a device that performs a process of performing the rendering process in which data subjected to the rendering process is cached can be considered. However, when the device that performs the rendering process has a configuration in which cache search is performed, the CPU resources are consumed for search, which means that the CPU resources are consumed in a process other than the rendering process.

SUMMARY OF THE INVENTION

The present invention provides an information processing system capable of suppressing a delay of start of a rendering process due to cache search, and performing variable printing in which the rendering process is sped up.

An information processing system of an embodiment of the present invention is an information processing system including a generation unit configured to generate variable data; and a rendering unit configured to perform rendering of the variable data, wherein the generation unit comprises: a management unit configured to store, as first management information, the generated variable data and identification information for identifying the variable data in association with each other to manage the generated variable data and the identification information; and a determination unit configured to check whether or not the generated variable data is included in the first management information, and determine that rendering data obtained by performing rendering on the variable data is cached if the generated variable data is included in the first management information.

Further features of the present invention will become apparent from the following description of exemplary embodiments (with reference to the attached drawings).

BRIEF DESCRIPTION OF THE DRAWINGS

FIGS. 8A to 8C are diagrams illustrating a transition of data and related data stored in an embodiment.

FIGS. 9A to 9C are diagrams illustrating a transition of data and related data stored in an embodiment.

FIGS. 12A to 12C are diagrams illustrating a transition of data and related data stored in an embodiment.

FIGS. 13A to 13C are diagrams illustrating a transition of data and related data stored in an embodiment.

FIGS. 15A to 15D are diagrams illustrating a transition of data and related data stored in an embodiment.

FIGS. 16A to 16C are diagrams illustrating a transition of data and related data stored in an embodiment.

DESCRIPTION OF THE EMBODIMENTS

First, problems in variable printing with time constraints will be described with reference to FIGS. 1 and 17 to 19 prior to the description of an embodiment for carrying out the present invention.

Figure 17:
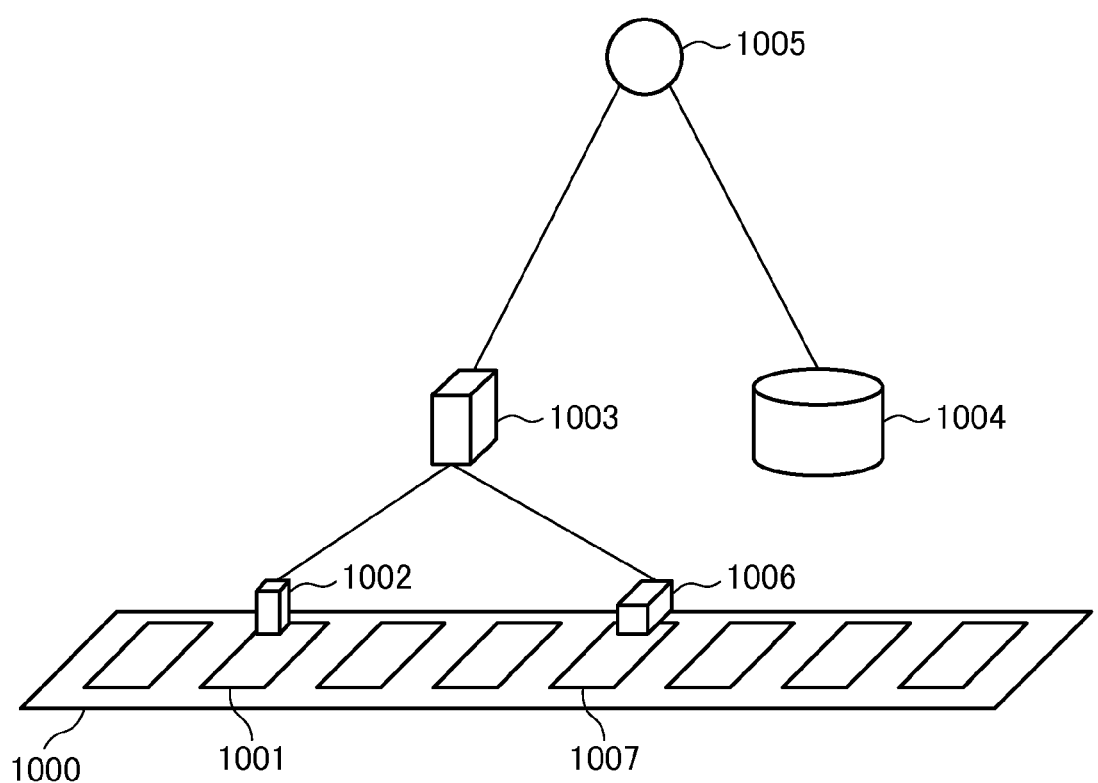
FIG. 17 is a diagram illustrating an entire configuration of a conventional printing system.

FIG. 17 is a diagram illustrating an example of a conventional entire configuration of a printing system that is an example of an information processing system.

A conveying apparatus 1000 conveys a printed material. A belt conveyor is assumed herein. A printed material 1001 is a printed material that is placed on the conveying apparatus 1000 as a print target and moves. A bar code (print target identification information) for identifying each printed material is assumed to have been printed on the printed material. A print target identification information acquisition device 1002 acquires the print target identification information associated with the print target. Here, an example of the print target identification information acquisition device is assumed to be a barcode reader that reads the bar code printed on the printed material.

A rendering device 1003 generates print data using the print target identification information acquired from the print target identification information acquisition device 1002, and variable data and template data corresponding to the print target identification information stored in a database (DB) 1004 to be described below. The template data is data of a template in which the variable data is embedded. The database (DB) 1004 stores data necessary for variable printing, such as the variable data or the template data corresponding to the print target identification information. A network (NW) 1005 is a network to which the rendering device 1003 or the DB 1004 is connected, and that is used to exchange data. A printing device 1006 prints rendered print data (rendering data) generated by the rendering device 1003. A printed material 1007 is a printed material printed by the printing device 1006.

Figure 18:
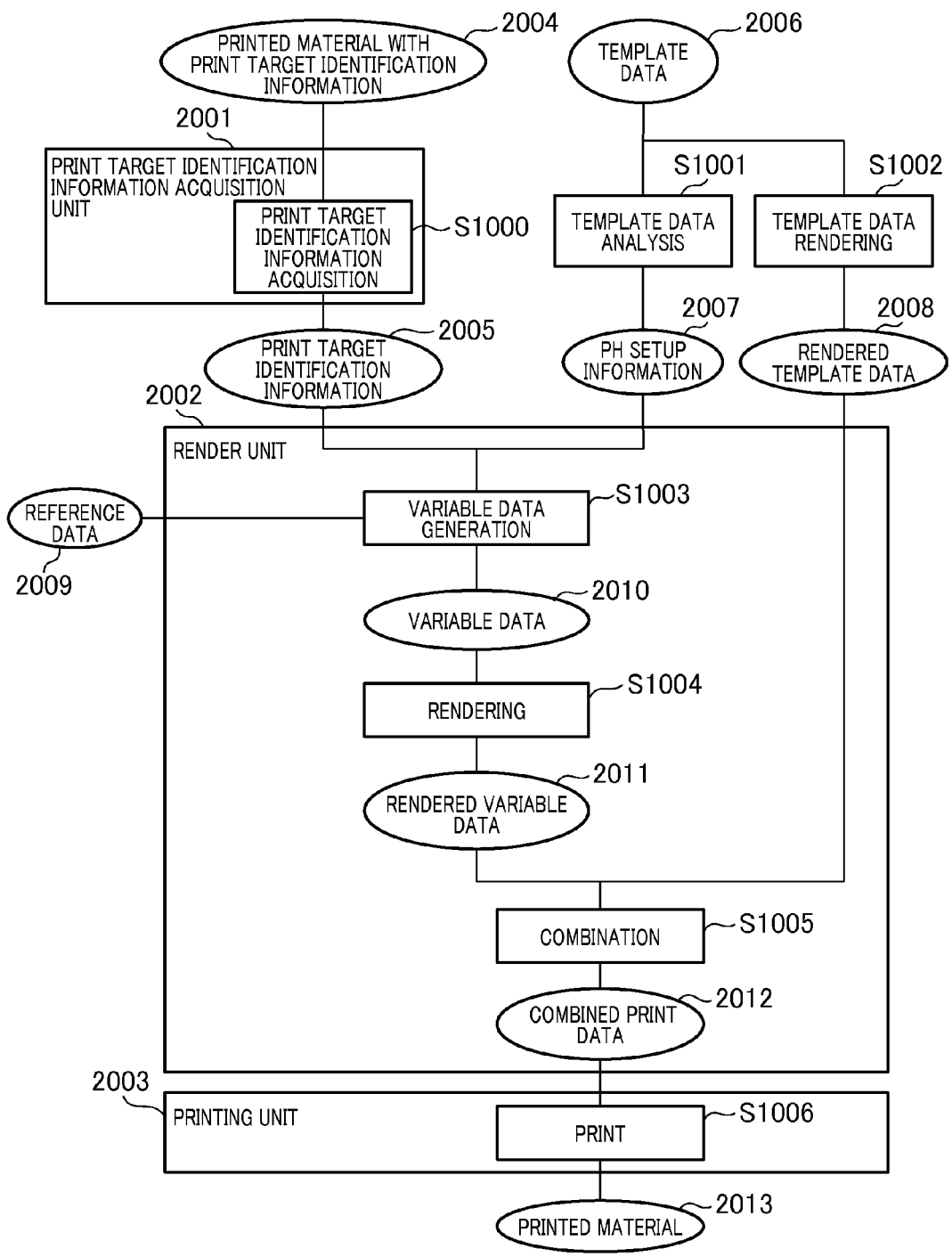
FIG. 18 is a diagram illustrating a flow of a printing process in the conventional printing system.

FIG. 18 is a diagram illustrating a flow of a printing process in the printing system illustrated in FIG. 17.

A print target identification information acquisition unit 2001 corresponds to the print target identification information acquisition device 1002 in FIG. 17, and acquires the print target identification information associated with the printed material. The rendering unit 2002 corresponds to the rendering device 1003 in FIG. 17, and generates print data using the print target identification information and template data. A printing unit 2003 corresponds to the printing device 1006 in FIG. 17, and prints the print data generated by the rendering unit 2002.

In step S1000, the print target identification information acquisition unit 2001 reads the bar code printed on the printed material (a printed material with print target identification information 2004 in FIG. 18) flowing on the conveying apparatus, and outputs print target identification information 2005.

In step S1001, a processing unit of a server that is not shown reads template data 2006 stored in a DB 1004, and outputs PH setting information 2007, such as the number of placeholders (a frame for applying variable data; hereinafter referred to as PH) included in the template data 2006, PH layout information such as a position or a size set in each PH, and a rendering intent (color reproduction method).

In step S1002, the processing unit on the server that is not shown reads the template data 2006 stored in the DB 1004, converts the template data 2006 to print data, and generates rendered template data 2008.

In step S1003, the rendering unit 2002 acquires variable source data corresponding to the print target identification information 2005 from reference data 2009, and generates variable data 2010 according to a setting described in PH setup information 2007. Here, the reference data 2009 refers to a correspondence table of the print target identification information and information associated therewith. For example, in the case of drug label printing, the reference data 2009 refers to attribute values of a patient, such as a patient name, sex, and age, and a drug name associated with an identification number of each patient. Here, the attribute values are referred to as the variable source data. Further, the variable data 2010 refers to data obtained by performing processing and conversion to data on the variable source data immediately before rendering. For example, when the variable source data is text data, the variable data 2010 is obtained by applying a setting of a font, a size, color, a style, or the like to the text data. Further, when the variable source data is image data, the variable data 2010 is data obtained by performing image processing such as scaling, modification, and application of effects on the image data.

In step S1004, the rendering unit 2002 converts the variable data 2010 to data that can be printed by the printing device, and generates rendered variable data 2011.

In step S1005, the rendering unit 2002 applies the rendered variable data 2011 to a PH of rendered template data 2008, and generates combined print data 2012.

In step S1006, the printing unit 2003 prints the combined print data 2012 and generates a printed material 2013.

Through the above flow, the printed material on which information (variable data) corresponding to the bar code printed on the printed material is printed, is printed. Here, in the rendering process in S1004, a processing load is generally high, and it takes time to perform the processing. In the configuration illustrated in FIG. 17, since the variable data applied to the PH each time one sheet is printed should be rendered each time, a conveying speed of the conveying apparatus 1000 cannot be increased over the rendering process, and there is a bottleneck in an increase in an amount of production.

Therefore, achieving a high-speed rendering process or a method with no rendering process is important in constructing a printing system. A high-speed rendering process is achieved through an approach of parallelization or hardware implementation of the rendering process. On the other hand, for the method with no rendering process, a cache-based approach in which rendering data once used is stored and uses the stored rendering data when variable data thereof appears again is considered.

There are two main trends in use frequencies of the variable data used in the variable printing. The first is data that is unlikely to appear again after being printed once, such as a personal name or a personal telephone number, for example, in the drug label printing described above. Further, the second is data that repeatedly appears selectively among previously prepared candidates, such as a medicine name, a dose, or usage instructions. Since the former data is unlikely to appear again, the data is not expected to be reused even if the data is cached. On the other hand, since the latter data repeatedly appears, it is possible to reduce the number of rendering processes by caching and reusing the data. Therefore, it is effective to consider a printing system with a cache. In the present embodiment, the printing system with a cache is considered.

Figure 1:
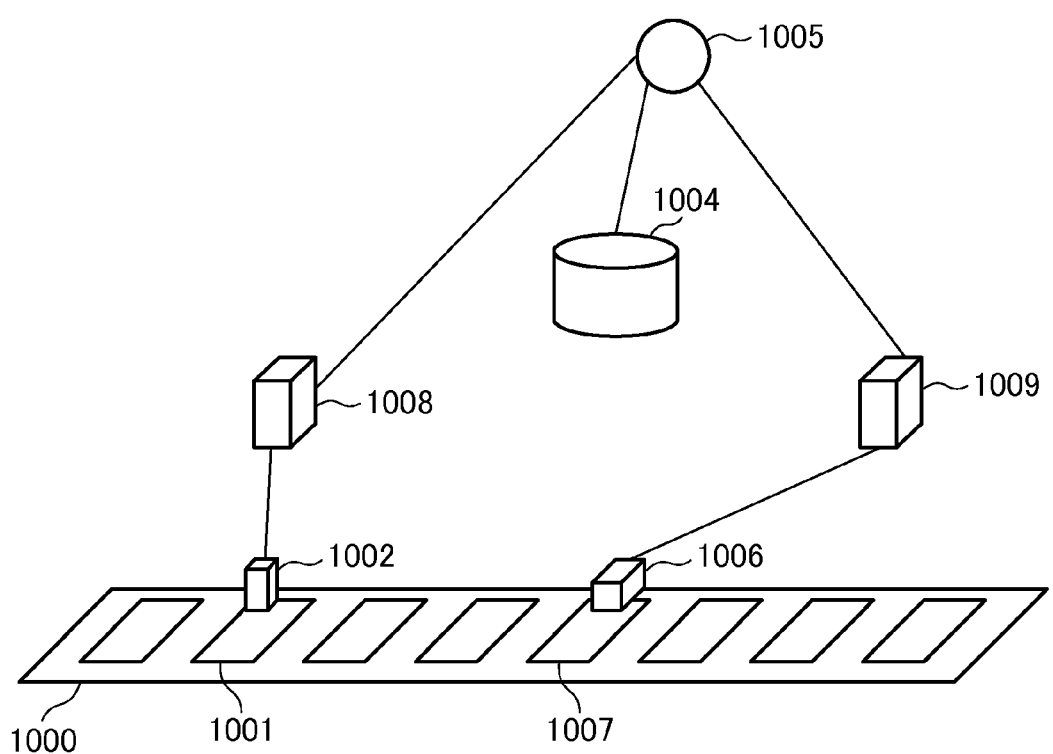
FIG. 1 is a diagram illustrating an example of an entire configuration of a printing system according to an embodiment of the present invention.

FIG. 1 is a diagram illustrating an example of an entire configuration of a printing system that is an example of the information processing system according to the present embodiment. The same configurations as those in FIG. 17 are denoted with the same reference numerals and description thereof will be omitted.

The data generation device 1008 generates variable data based on print target identification information. The rendering device 1009 caches the variable data generated by the data generation device 1008 and performs a rendering process to generate rendered print data, if necessary. In the printing system illustrated in FIG. 1, a cache is used, and a data generation process and a rendering process are executed with different hardware, thereby speeding up the rendering process.

Figure 19:
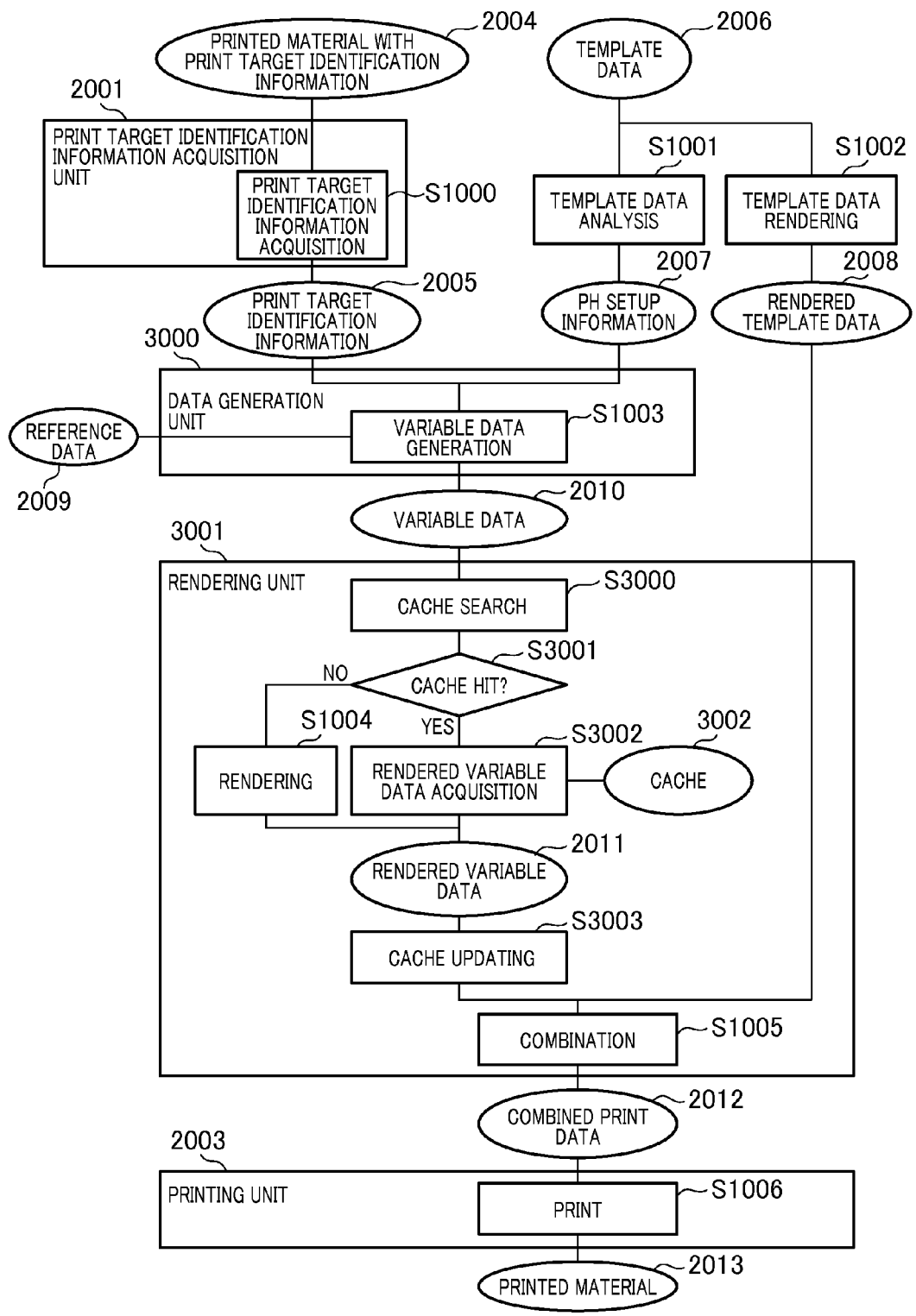
FIG. 19 is a diagram illustrating an example of a flow of a process of the printing process system.

FIG. 19 is a diagram illustrating an example of a flow of a process in the printing system illustrated in FIG. 1. The same processes as those in FIG. 18 are denoted with the same reference numerals, and description thereof will be omitted.

The data generation unit 3000 acquires the variable source data corresponding to the print target identification information 2005 from the reference data 2009, applies the PH setup information 2007, and generates the variable data 2010. The rendering unit 3001 acquires the variable data 2010 and the rendered template data 2008, and generates combined print data 2012 using a cache. The variable data 2010 and its rendered variable data 2011 are stored in association with each other in the cache 3002. The corresponding rendered variable data can be acquired by inputting the desired variable data 2010.

In step S3000, the rendering unit 3001 determines through search whether or not the rendered variable data 2011 corresponding to the variable data 2010 is stored in the cache 3002.

In step S3001, when the rendering unit 3001 finds the desired rendered variable data 2011 corresponding to the variable data 2010 as a result of the cache search, the rendering unit 3001 proceeds to step S3002. On the other hand, when the rendering unit 3001 does not find the desired rendered variable data 2011, the rendering unit 3001 proceeds to step S1004.

In step S3002, the rendering unit 3001 acquires the rendered variable data 2011 corresponding to the variable data 2010 from the cache 3002.

In step S3003, the rendering unit 3001 updates content of the cache 3002 based on a predetermined cache algorithm.

By caching the rendered variable data in this way, it is possible to reuse the data, reduce the number of rendering processes, and reduce a processing load of the rendering device.

However, in the above printing system, when the cache is searched and the desired data is not found, a rendering process for the variable data (step S1004) starts from that point of time. Accordingly, when the desired data is not found, the start of the rendering process is delayed by a cache search time. Therefore, in the present embodiment, the printing system that performs the rendering process without causing a delay in the start of the rendering process due to the cache search is provided.

Hereinafter, embodiments of the present invention will be described with reference to the drawings or the like.

First Embodiment

Since an entire configuration of a printing system in the present embodiment is the same as that in FIG. 1, description thereof will be omitted.

<Logical Configuration of Printing System>

Figure 2:
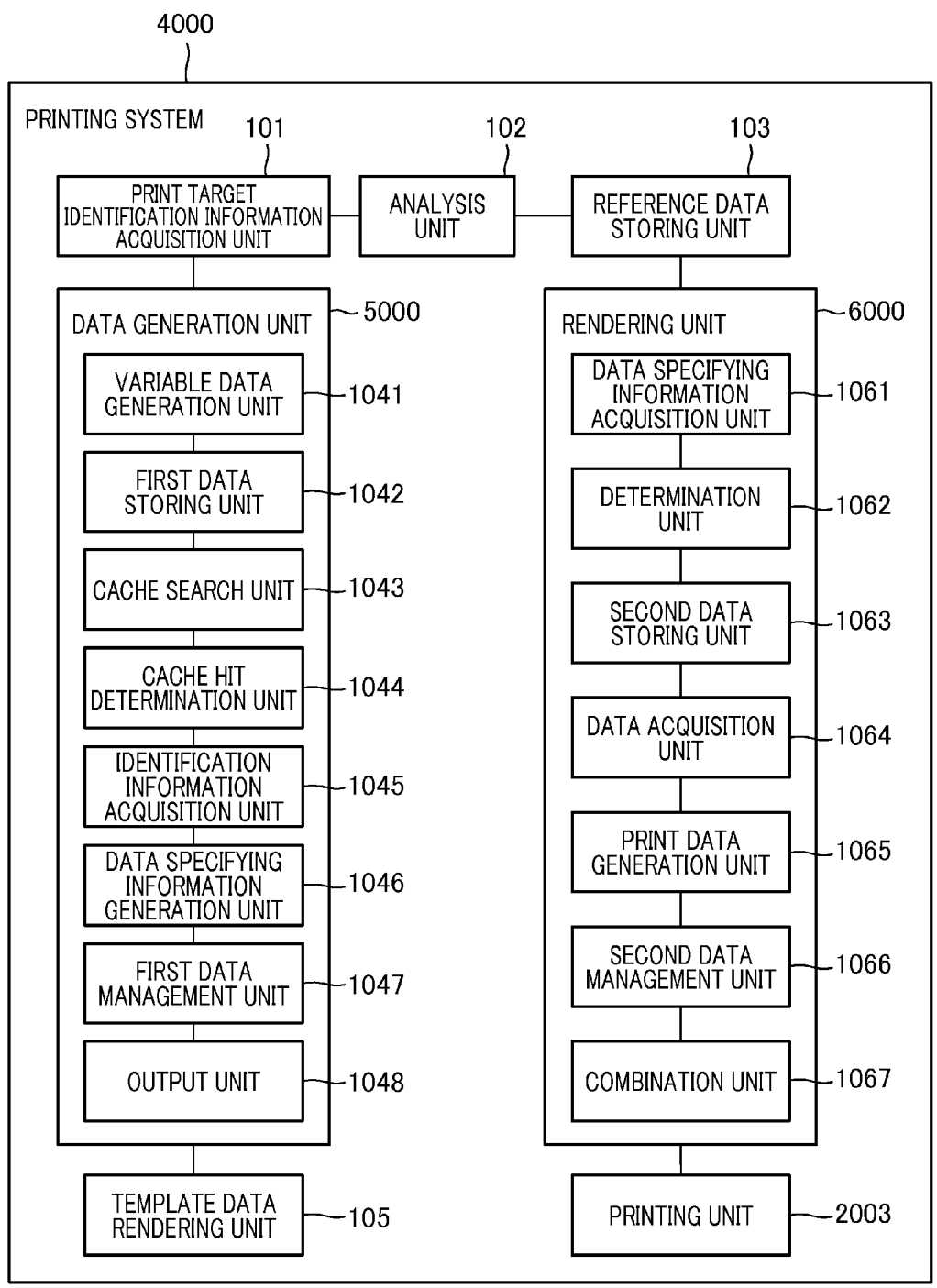
FIG. 2 is a diagram illustrating a logical configuration of the printing system according to an embodiment.

FIG. 2 is a diagram illustrating a logical configuration of the printing system according to the present embodiment. The printing system 4000 includes a print target identification information acquisition unit 101, an analysis unit 102, a reference data storing unit 103, a data generation unit 5000, a rendering unit 6000, a template data rendering unit 105, and a printing unit 2003.

The print target identification information acquisition unit 101 acquires print target identification information associated with a printed material. The analyzing unit 102 analyzes template data and acquires setting information on a PH included in the template data. The reference data storing unit 103 stores the print target identification information and variable source data associated with the print target identification information. The data generation unit 5000 generates data specifying information based on the print target identification information (the data specifying information will be described below). The rendering unit 6000 generates print data in which the template data and the variable data are combined based on the data specifying information. The template data rendering unit 105 renders the template data. The printing unit 2003 prints the combined print data.

The data generation unit 5000 includes modules 1041 to 1048. A variable data generation unit 1041 acquires the variable source data corresponding to the print target identification information from the reference data, and applies the PH setup information to the variable source data to generate variable data. A first data storing unit 1042 is a first data storing unit for storing a first correspondence relationship (first management information) in which the variable data and identification information for identifying the rendered variable data corresponding thereto are associated with each other. A cache search unit 1043 is a cache search unit that searches for predetermined variable data from the first correspondence relationship. A cache hit determination unit 1044 distributes processing depending on whether or not there is predetermined variable data in the first correspondence relationship. An identification information acquisition unit 1045 acquires identification information associated with the predetermined variable data stored in the first correspondence relationship. A data specifying information generation unit 1046 sets the data specifying information (hereinafter, the identification information and the variable data are included when the data specifying information is referred to) in the PH. A first data management unit 1047 manages the first correspondence relationship based on a predetermined management scheme. An output unit 1048 outputs the data specifying information.

The rendering unit 6000 includes modules 1061 to 1067. A data specifying information acquisition unit 1061 acquires the data specifying information. A determination unit 1062 determines whether the data is the identification information or the variable data by referring to the data specifying information. A second data storing unit 1063 stores a second correspondence relationship (second management information) in which the identification information and the address information indicating a storage destination of the rendered variable data are associated with each other. A data acquisition unit 1064 acquires the rendered variable data corresponding to the predetermined identification information from the second correspondence relationship. A print data generation unit 1065 converts the variable data to the print data and generates the rendered variable data. A second data management unit 1066 manages the second correspondence relationship based on a predetermined management scheme. A combination unit 1067 combines the rendered variable data with the rendered template data.

<Hardware Configuration of Data Generation Device and Rendering Device>

Figure 3:
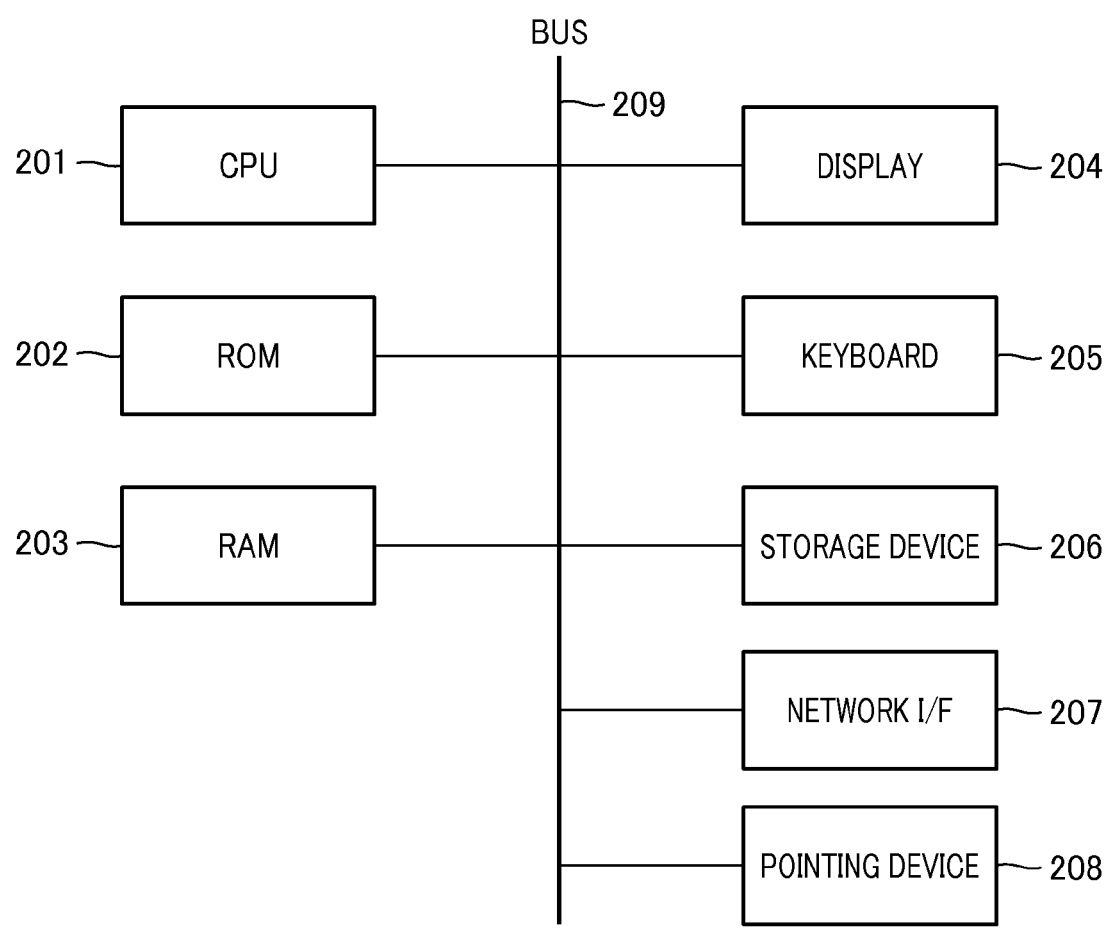
FIG. 3 is a diagram illustrating a hardware configuration of a data generation device and a rendering device.

FIG. 3 is a diagram illustrating a hardware configuration of the data generation device and the rendering device.

A CPU 201 reads, analyzes and executes a computer program stored on a storage device 206 to be described below. Further, the CPU 201 is a central processing unit (CPU) that controls a RAM 203, a display 204, or the like connected to a bus via a bus 209 to be described below. A ROM 202 is a read only memory (ROM) that performs input and output control at a low level with respect to hardware connected to the bus. The RAM 203 is a random access memory (RAM) that temporarily stores information when the CPU 201 performs calculation. The display 204 displays a result of the calculation in the CPU. A keyboard 205 receives input from a user. However, since a touch panel is included if a terminal is a smart device, the keyboard 205 may not be included. The storage device 206 stores programs or data used for the calculation. A network I/F 207 is a network interface (I/F) for connection to a network such as a local network, intranet, or Internet. A pointing device 208 refers to a mouse, a trackball, or the like that receives coordinates designated by the user on a screen. The bus 209 is a signal line to which the CPU 201 to the pointing device 208 are connected.

<Flow of Printing Process>

Figure 4:
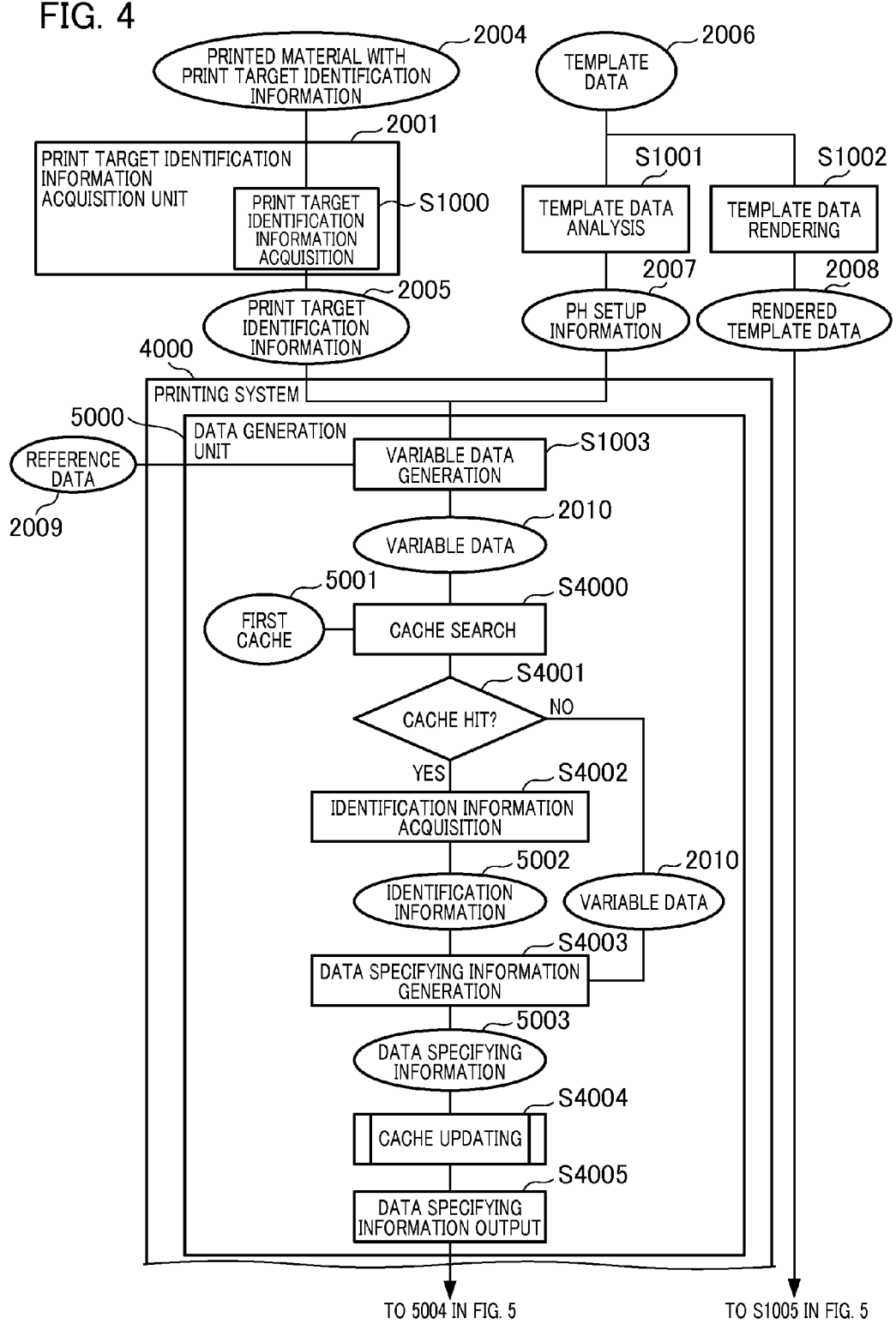
FIG. 4 is a diagram illustrating a flow of a process of the printing system according to an embodiment.
Figure 5:
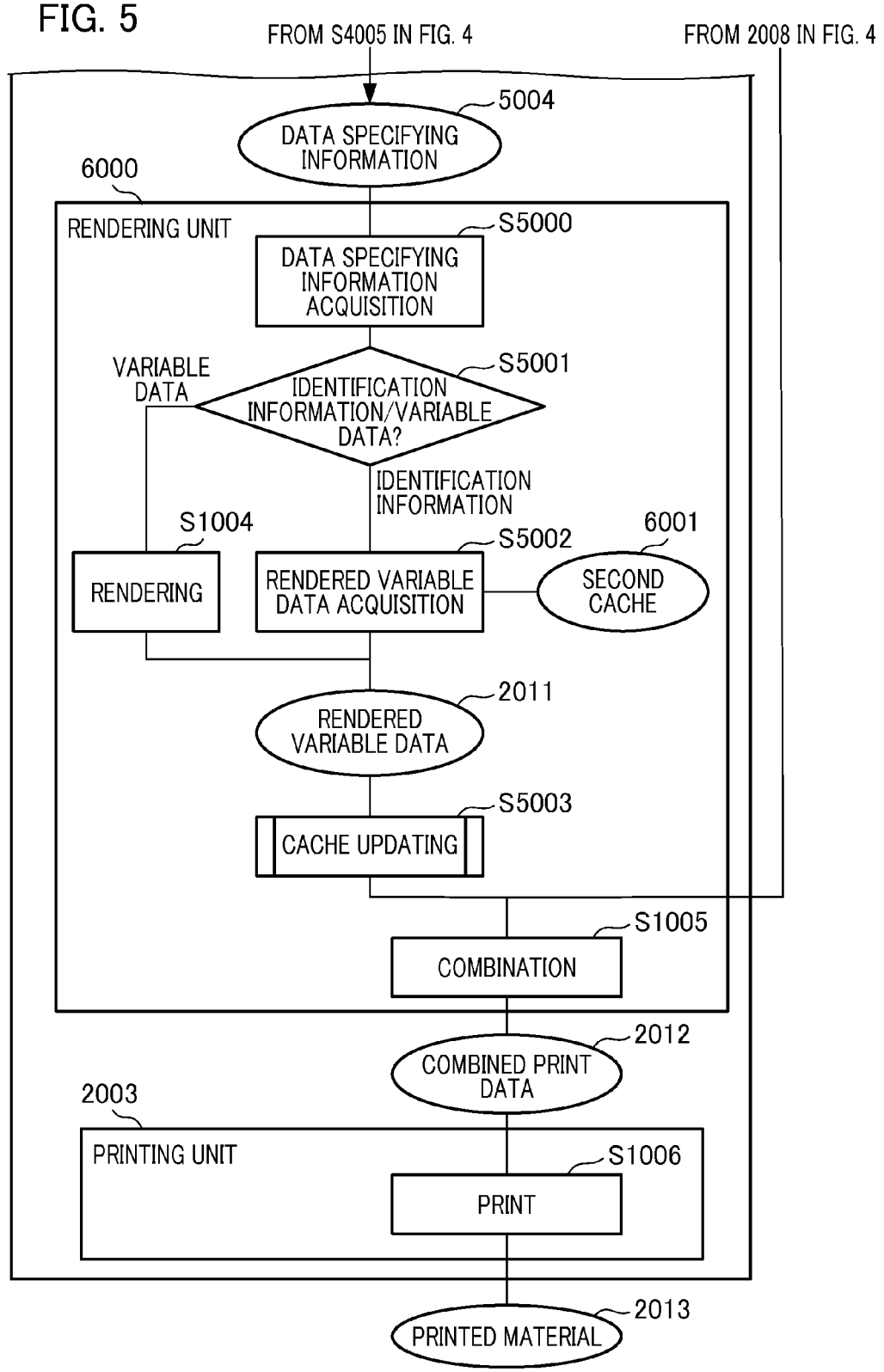
FIG. 5 is a diagram illustrating a flow of a process of the printing system according to an embodiment.

FIGS. 4 to 5 are diagrams illustrating a flow of a process of the printing system according to the present embodiment. The same processes as those in FIGS. 18 and 19 are denoted with the same reference numerals, and description thereof will be omitted.

In step S4000, the cache search unit 1043 searches for predetermined variable data 2010 from a first cache 5001 (first correspondence relationship).

In step S4001, a cache hit determination unit 1044 determines whether there is predetermined variable data 2010 in the first correspondence relationship. When it is determined that there is predetermined variable data 2010, the process proceeds to step S4002, and when it is determined that there is no predetermined variable data 2010, the process proceeds to step S4003.

In step S4002, the identification information acquisition unit 1045 acquires identification information 5002 corresponding to the predetermined variable data 2010 from the first correspondence relationship.

In step S4003, the data specifying information generation unit 1046 generates the identification information 5002 as data specifying information 5003 when there is predetermined variable data 2010 in the first correspondence relationship, and generates the variable data 2010 as data specifying information 5003 when there is no predetermined variable data 2010.

In step S4004, the first data management unit 1047 updates the first correspondence relationship according to a predetermined cache algorithm. In the present embodiment, with the caching algorithm, the first correspondence relationship is assumed to be updated according to a rule that first cached data be discarded first. An updating method will be described below in detail.

In step S4005, the output unit 1048 outputs the data specifying information 5003 generated in step S4003, and transmits the data specifying information 5003 to the rendering unit 6000.

In step S5000, the data specifying information acquisition unit 1061 of the rendering unit 6000 acquires (receives) the data specifying information 5003 output from the data generation unit 5000 in step S4005.

In step S5001, the determination unit 1062 determines whether the data stored in the acquired data specifying information 5003 is the identification information 5002 or the variable data 2010. When it is determined that the data is the identification information 5002, the process proceeds to step S5002. When it is determined that the data is the variable data 2010, the process proceeds to step S1004.

In step S5002, the data acquisition unit 1064 acquires the rendered variable data 2011 using the address information of the rendered variable data corresponding to the identification information 5002 from the second cache 6001 (second correspondence relationship).

In step S5003, the second data management unit 1066 updates the second correspondence relationship according to a predetermined cache algorithm.

Figure 6:
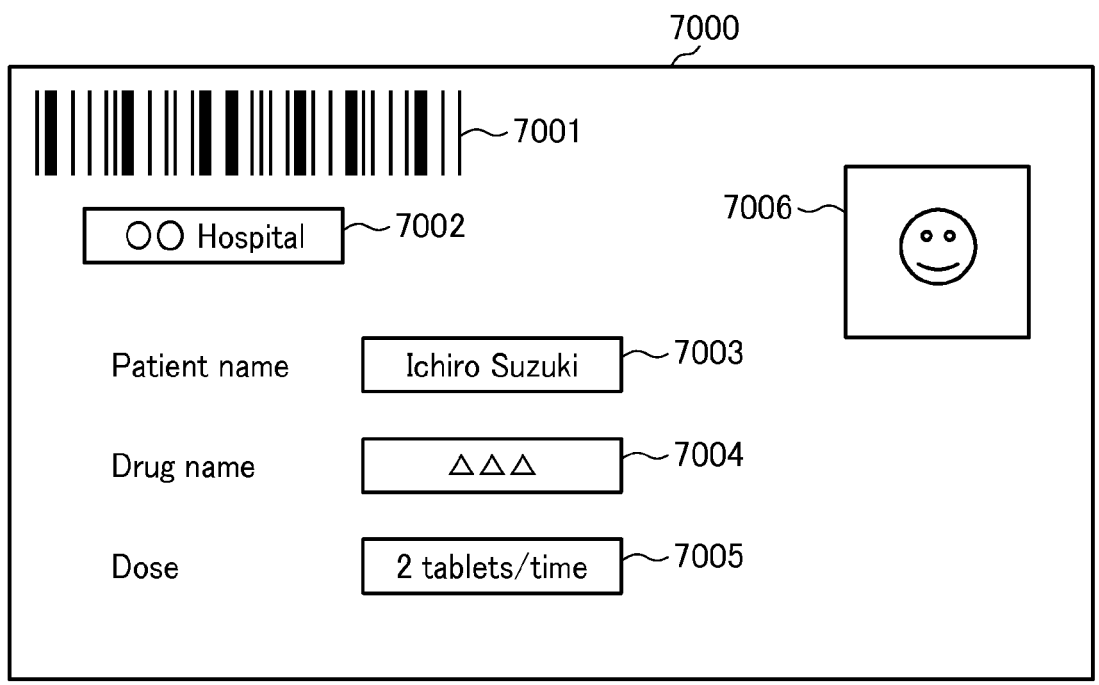
FIG. 6 is a diagram illustrating an example of a printed material according to an embodiment.

FIG. 6 is a diagram illustrating an example of a printed material in the present embodiment.

In FIG. 6, a drug label 7000 is affixed to a container containing a drug. The drug label 7000 includes a bar code 7001 for identifying an individual patient, a hospital name 7002, a patient name 7003, a drug name 7004, a dose 7005 of the drug, and a hospital stamp 7006 of a hospital. The barcode 7001 is assumed to have been printed by a separate printing device in advance. Further, in 7002 to 7006, variable data suitable for each PH already registered as PH is applied. 7002 to 7005 are text data, and 7006 is image data.

Figure 7B:
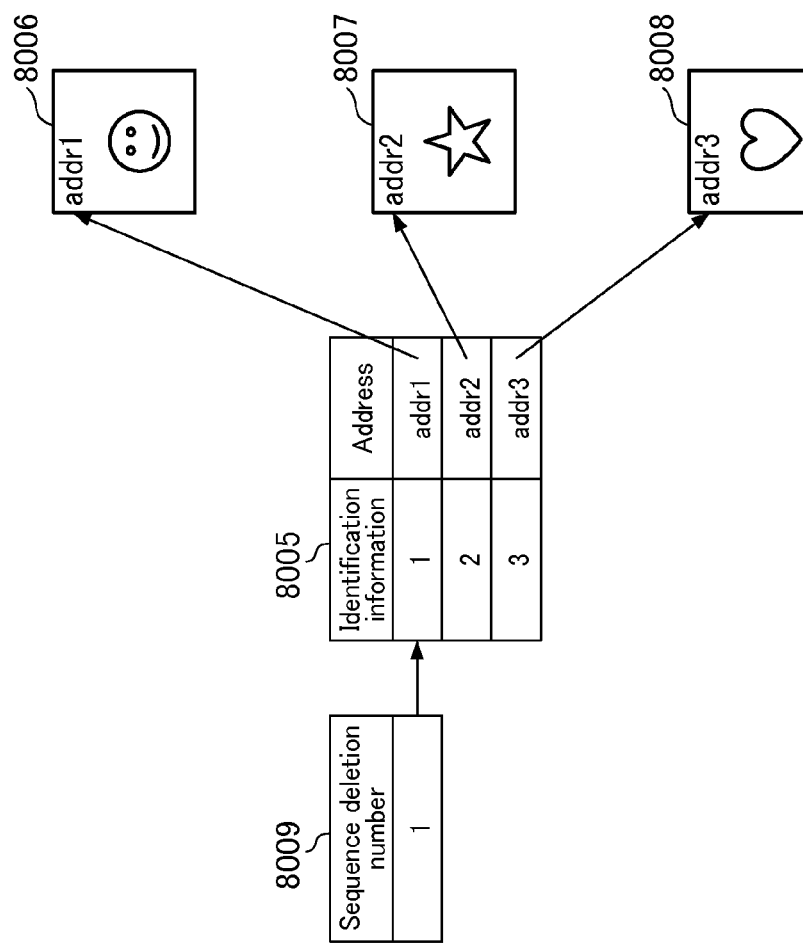
FIGS. 7A and 7B are diagrams illustrating a structure of data stored in an embodiment.
Figure 7A:
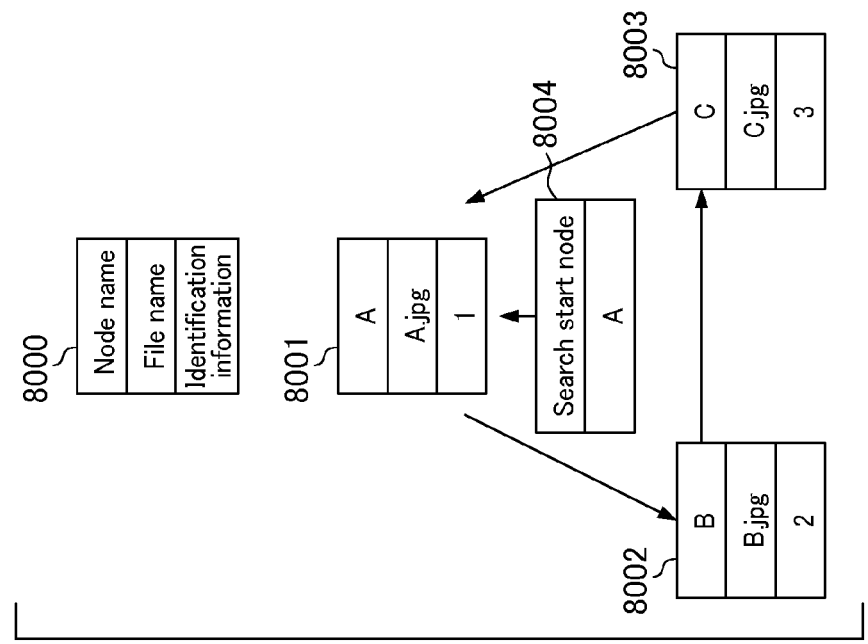

FIGS. 7A and 7B are diagrams illustrating a structure of data stored in the first data storing unit 1042 and the second data storing unit 1063 in the present embodiment.

FIGS. 7A and 7B illustrate structures of the data stored in the first data storing unit 1042 and the second data storing unit 1063, respectively.

A node 8000 stores a set of variable data and identification information corresponding thereto, and stores a node name, a value of the variable data (a file name herein), and the identification information. Nodes 8001 to 8003 are nodes A, B, and C, respectively. Cyclically, node A points to B, node B points to C, and node C points to A. A search start node pointer 8004 is a pointer that points the node among the nodes A, B, and C from which the cache search is performed. A sequence 8005 stores the identification information and the rendered variable data corresponding to the identification information in association with each other. Rendered variable data 8006 to 8008 is rendered variable data indicated by addresses corresponding to the identification information stored in the sequence 8005. A sequence deletion number 8009 stores a number of the sequence to be subsequently deleted when the second correspondence relationship is updated.

FIGS. 8A to 9C are diagrams illustrating a transition of data and related data stored in the first data storing unit 1042 and the second data storing unit 1063 when the printing system 4000 sequentially acquires the variable data.

The tables in FIG. 8A represent variable data input to the printing system 4000, the search start node pointer, the information of the respective nodes 8001 to 8003, the data specifying information, the sequence deletion number, the sequence, and the rendered variable data corresponding to the identification information sequentially from left. The tables of FIGS. 8B to 9C are arranged in the same way as those of FIG. 8A.

FIGS. 8A to 9C illustrate a transition when images A.jpg, B.jpg, C.jpg, A.jpg, and D.jpg are sequentially requested as the variable data 2010. Here, the rendered variable data corresponding to the variable data stored in the node A8001 is stored in element 1 of the sequence 8005. Similarly, the rendered variable data corresponding to the variable data stored in nodes B and C is stored in the elements 2 and 3 of the sequence 8005, respectively.

FIG. 8A illustrates an initial state in which no data is contained. In the initial state, the search start node pointer is node A, and a sequence deletion number is 1.

FIG. 8B illustrates a case in which A.jpg has been requested as the variable data. In this case, since the search start node pointer is node A, it is determined whether there is data by referring to node A. Since it is determined that the data is not stored, a character string A.jpg that is a file name of the variable data is stored in node A. The data generation unit 5000 outputs the character string A.jpg as data specifying information. The rendering unit 6000 acquires the data specifying information, and determines that there is no rendered variable data corresponding to A.jpg in the second data storing unit 1063 since content of the data specifying information is A.jpg rather than the identification information (S5001). The rendering unit 6000 renders an image A.jpg and stores an address of the rendered variable data in a first element of the sequence.

FIGS. 8C and 9A illustrate a case in which B.jpg and C.jpg are sequentially requested next as variable data. Respective character strings B.jpg and C.jpg are stored in an order of node B and node C, and addresses (pointers) 200 and 300 of rendered variable data are stored in an order of a second element and a third element, like in FIG. 8B.

FIG. 9B illustrates a case in which A.jpg has been subsequently requested as the variable data again. Since the search start node pointer points to node A, node A is searched first. Since A.jpg is stored in node A, identification information 1 included in node A is stored in the data specifying information. When the rendering unit 6000 acquires the data specifying information, the rendering unit 6000 follows the address 100 stored in element 1 of the sequence since 1 is stored in the data specifying information, and acquires the rendered variable data RA.dat (S5002).

FIG. 9C illustrates a case in which D.jpg has been subsequently requested as the variable data. Since the search start node pointer points to node A, node A is searched first. Since D.jpg is not found even after searching all nodes, a character string D.jpg is stored in node A to which the search start node pointer points, and the search start node pointer proceeds by one node and points to node B. The character string D.jpg is stored in the data specifying information, and the data specifying information is output. The rendering unit 6000 acquires the data specifying information, determines that there is no corresponding rendered variable data in the sequence since the character string is contained, and renders an image D.jpg, as in the case of FIGS. 8B to 9A. The rendering unit 6000 stores an address of the rendered variable data in the sequence. However, when the values are contained in all of the elements of the sequence as illustrated in FIG. 9C, content of the element corresponding to the sequence deletion number is rewritten (stored) to a new address, and the sequence deletion number increases by 1. Here, since the sequence deletion number is 1, content of element 1 in the sequence is rewritten to an address of RD.dat that is the rendered variable data of D.jpg, and the sequence deletion number is updated to 2.

As described above, according to the present embodiment, the processing unit that generates the print data using the cached rendered print data and performs the rendering process can use the cached rendered print data without performing the search of the cache. Accordingly, it is possible to suppress delay of the start of the rendering process due to the cache search and perform variable printing in which the rendering process is sped up.

While the sequence and the hash table have been used as the respective data structures of the first correspondence relationship and the second correspondence relationship in the present embodiment, the present invention is not limited thereto. For example, in the first correspondence relationship and the second correspondence relationship, any one of the one-way circulation list, the sequence, and the hash table may be used. That is, a structure in which management can be easily performed according to an agreement may be used so that the first correspondence relationship and the second correspondence relationship can match each other. With the agreement in the present embodiment, the identification number used in the first correspondence relationship and the second correspondence relationship is a predetermined number of numbers that may be determined in advance, and the data may be associated with the identification number in a predetermined order. Further, if the identification number to be associated with the data is insufficient, the already correlated data may be overwritten with newly generated data in a predetermined order to update the first correspondence relationship and the second correspondence relationship.

Second Embodiment

Next, a printing system according to a second embodiment of the present invention will be described. In the first embodiment, a one-way circulation list and a sequence are used as data structures of the first correspondence relationship and the second correspondence relationship, respectively. Further, a rule that first cached data will be discarded first is used as a management scheme for data of each correspondence relationship. This method is characterized in that, since fewer tables are used, mounting is relatively easy. On the other hand, in the present embodiment, a case in which variable data having a high reference frequency gets more cache hits when there is locality in an appearance tendency of the variable data will be described. Further, a case in which a sequence and a hash table are used will be described as another example of the data structure of the respective correspondence relationships.

Since an entire configuration of the printing system according to the present embodiment and a hardware configuration are the same as those in the first embodiment, description thereof is omitted. Further, other logic configurations and processes that are the same as those in the first embodiment are denoted with the same reference numerals, and description thereof is omitted.

Figure 10:
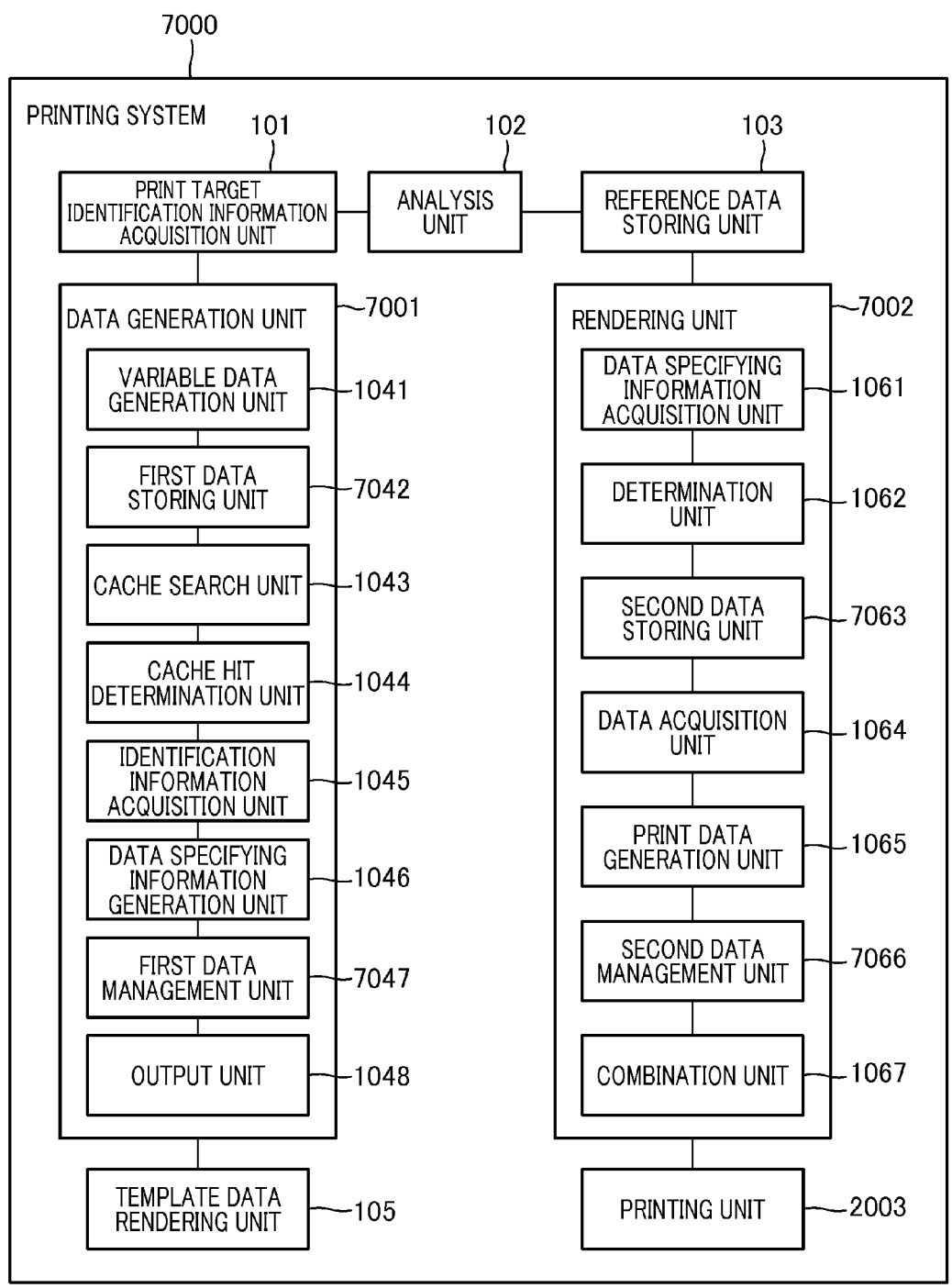
FIG. 10 is a diagram illustrating a logical configuration of a printing system according to an embodiment.

FIG. 10 is a diagram illustrating a logical configuration of the printing system according to the present embodiment.

A printing system 7000 includes a data generation unit 7001 that generates variable data, and a rendering unit 7002 that generates rendered print data. The data generation unit 7001 includes a first data storing unit 7042 and a first data management unit 7047. The first data storing unit 7042 stores a first correspondence relationship in which the variable data and the identification information are associated with each other. Further, the first data management unit 7047 manages the first correspondence relationship based on a predetermined management scheme.

The rendering unit 7002 includes a second data storing unit 7063 and a second data management unit 7066. The second data storing unit 7063 stores a second correspondence relationship in which the identification information and the rendered variable data are associated with each other. The second data management unit 7066 manages the second correspondence relationship based on a predetermined management scheme. Since a flow of printing is the same as the flow of the process described with reference to FIGS. 4 and 5 in the first embodiment, description thereof will be omitted in the present embodiment.

Figure 11:
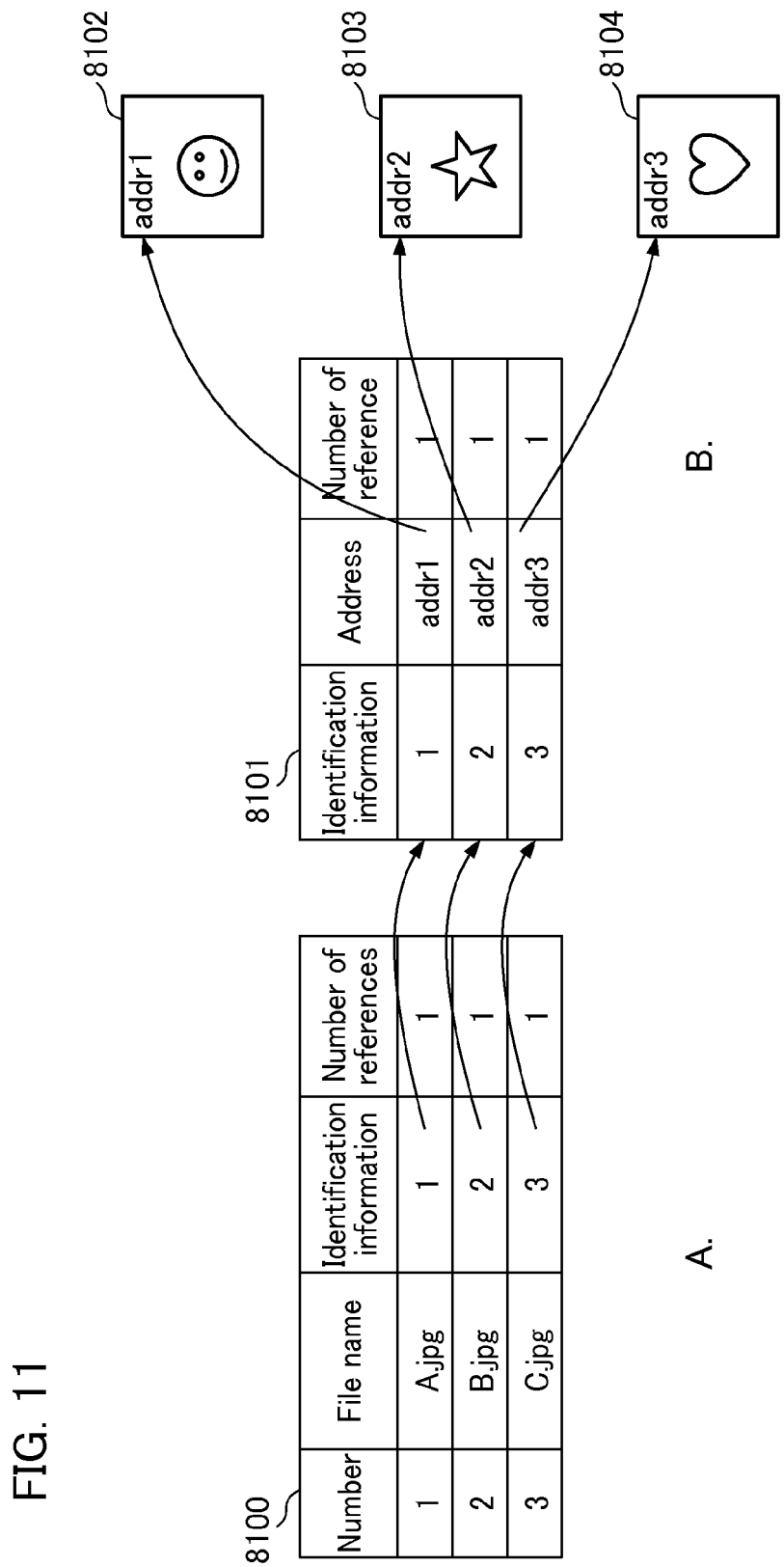
FIG. 11 is a diagram illustrating a structure of data stored in an embodiment.

FIG. 11 is a diagram illustrating a structure of data stored in the first data storing unit 7042 and the second data storing unit 7063 in the present embodiment.

A. and B. shown in FIG. 11 illustrate the structure of data stored in the first data storing unit 7042 and the second data storing unit 7063, respectively.

A set of variable data, identification information corresponding to the variable data, and a number of references of the element are stored for each element in a sequence 8100. Here, a file name is used as the variable data. The identification information, the address of the rendered variable data, and the number of references of the element are stored in association with one another in the hash table 8101. By using a hash table, it is possible to quickly acquire the corresponding address and the number of references of the element using the identification information as a key. The rendered variable data 8102 to 8104 is rendered variable data corresponding to the identification information stored in the hash table, respectively.

FIGS. 12A to 13C are diagrams illustrating a transition of data and related data stored in the first data storing unit 7042 and the second data storing unit 7063 when the printing system 7000 sequentially acquires the variable data.

The tables in FIG. 12A represent variable data 2010 input to the printing system 7000, a sequence 8100, data specifying information 5003, a hash table 8101, and the rendered variable data 2011 corresponding to identification information 5002 sequentially from left. The tables of FIGS. 12B to 13C are arranged in the same way as those of FIG. 12A.

FIGS. 12A to 13C illustrate a transition when images A.jpg, B.jpg, C.jpg, A.jpg, and D.jpg are sequentially requested as the variable data 2010. Here, the rendered variable data corresponding to the variable data stored in element 1 of a sequence 8100 is stored in element 1 of the hash table 8101. Similarly, rendered variable data corresponding to the variable data stored in elements 2 and 3 of the sequence 8100 is stored in elements 2 and 3 of the hash table 8101, respectively. Further, for addition of data to the sequence 8100, an element of which the number of references is small is updated (overwritten or deleted) first. The same applies to updating of the elements in the hash table 8101. In the sequence 8100 and the hash table 8101, when each element is referred to, the number of references is increased by one, and when the element is updated, the number of references returns to 1. For the hash table, the number of references is updated using the same method.

FIG. 12A illustrates an initial state in which no data is included. FIG. 12B illustrates a case in which A.jpg has been requested as the variable data. In this case, since all elements of the sequence are empty, a character string A.jpg that is a file name of the variable data is stored in element 1, and the number of references is set to 1. The data generation unit 7001 outputs the character string A.jpg as data specifying information. The rendering unit 7002 acquires the data specifying information, and determines that there is no rendered variable data corresponding to A.jpg in the second data storing unit 7063 since content of the data specifying information is A.jpg rather than the identification information (S5001). The rendering unit 7002 renders an image A.jpg, stores an address of the rendered variable data in element 1 of the hash table, and sets the number of references to 1.

FIGS. 12C and 13A illustrate a case in which B.jpg and C.jpg are subsequently requested in this order as variable data. Character strings B.jpg and C.jpg are stored in an order of element 2 and element 3 of the sequence, addresses (pointers) 200 and 300 of the rendered variable data are stored in the hash table, and the number of references is set to 1, like in FIG. 12B.

FIG. 13B illustrates a case in which A.jpg has been subsequently requested as the variable data again. Since a sequence is searched and A.jpg is stored in element 1, identification information 1 included in element 1 is stored in the data specifying information. The rendering unit 7002 acquires the data specifying information, and follows address 100 stored in an element in which a key of the hash table is 1 (identification information of the hash table in FIG. 13B is 1) since 1 is stored in the data specifying information. The rendering unit 7002 acquires the rendered variable data RA.dat (S5002). Further, the rendering unit 7002 sets the number of references corresponding to the element, which the key of the hash table is 1, to be 1.

FIG. 13C illustrates a case in which D.jpg has been subsequently requested as the variable data. Since D.jpg is not found even after searching all the elements of the sequence, a character string D.jpg is stored in element 2 having a small number of references, and the number of references is set to 1. The character string D.jpg is stored in the data specifying information, and the data specifying information is output. The rendering unit 7002 acquires the data specifying information, determines that there is no corresponding rendered variable data in the hash table since the character string is contained, and renders an image D.jpg. An address of the rendered variable data is stored in an element in which the number of references is small and the key is 2, and the number of references of the element in which the key is 2 is set to 1.

As described above, according to the present embodiment, the same effects as those of the first embodiment are achieved. Further, according to the present embodiment, since the numbers of references of the variable data are stored and thereby variable data having the large number of references is left in the cache, it is possible to further suppress the number of renderings when there is locality in an appearance frequency of variable data.

Third Embodiment

Next, a printing system according to a third embodiment of the present invention will be described. In the first and second embodiments, a storing period of the data stored in the first data storing unit and the second data storing unit has not been particularly mentioned. On the other hand, in the present embodiment, for example, in variable printing with a time limit, a case in which it is not preferable for the same variable data of which high confidentiality is required to be stored on a memory of a server for a long period of time will be considered. In the present embodiment, the data stored in the first data storing unit and the second data storing unit has reference information indicating whether or not the data is referred to, and the data is deleted when the data is not referred to. Thus, improvement of the confidentiality is achieved. Specifically, JobID (job information) indicating in which job (a unit of a series of printing processes) the data stored in the first data storing unit and the second data storing unit is referred to is stored in the data. If the data is not referred to when a predetermined number of jobs (in the present embodiment, three jobs) have passed, the data is deleted. Accordingly, it is possible to prevent the data that is not referred to from being stored in the memory for a long period of time.

Since an entire configuration of the printing system and a hardware configuration according to the present embodiment are the same as those in the first embodiment, description thereof is omitted. Further, other logic configurations and processes that are the same as those in the first embodiment are denoted with the same reference numerals, and description thereof is omitted.

Figure 14:
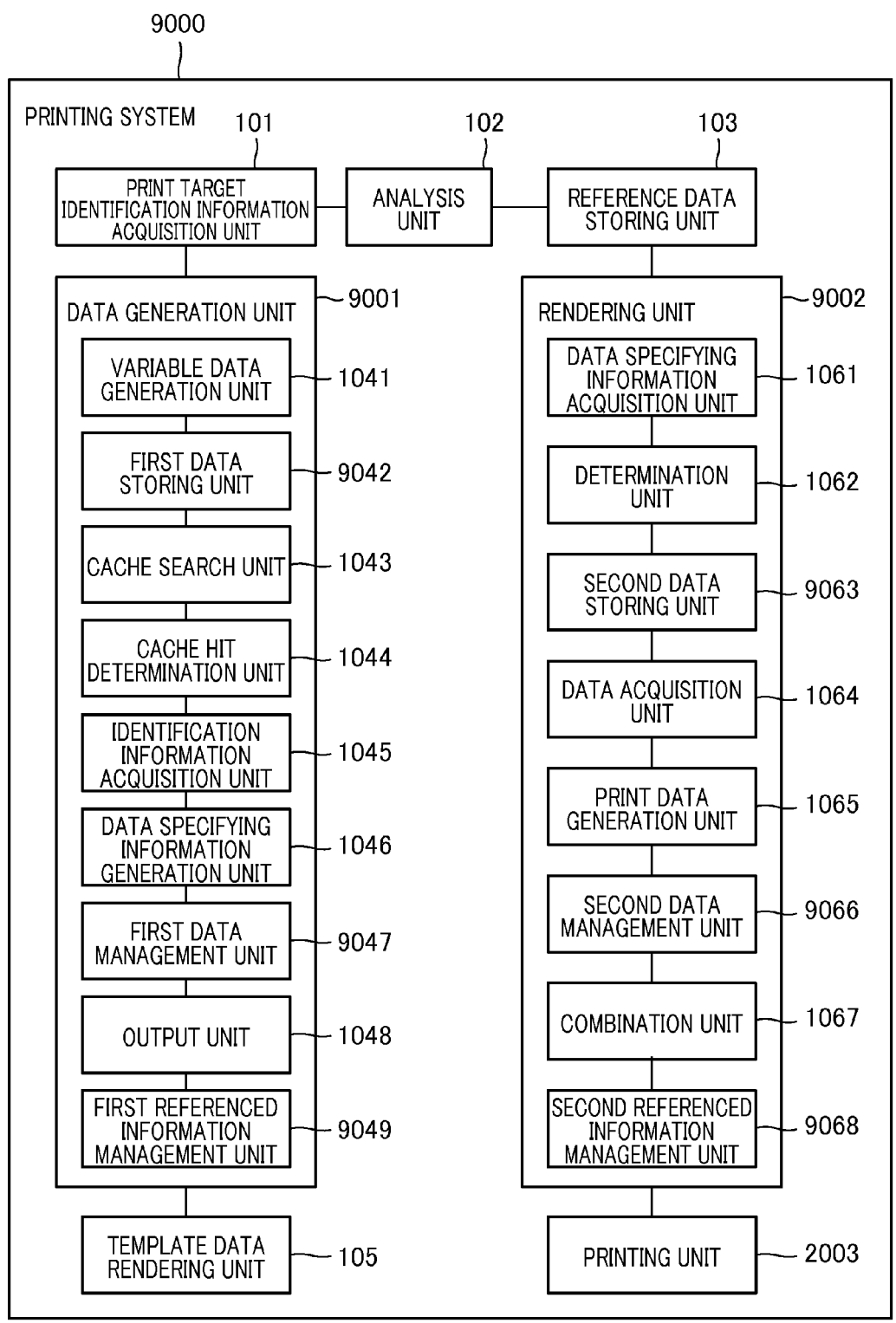
FIG. 14 is a diagram illustrating a logical configuration of a printing system according to an embodiment.

FIG. 14 is a diagram illustrating a logical configuration of the printing system according to the present embodiment.

A printing system 9000 includes a data generation unit 9001 that generates variable print data, and a rendering unit 9002 that generates rendered print data. The data generation unit 9001 includes a first data storing unit 9042, a first data management unit 9047, and a first referenced information management unit 9049. The first data storing unit 9042 stores a first correspondence relationship in which the variable data and the identification information are associated with each other. The first data management unit 9047 manages the first correspondence relationship based on a predetermined management scheme. The first referenced information management unit 9049 manages the referenced information in the first correspondence relationship.

The rendering unit 9002 includes a second data storing unit 9063, a second data management unit 9066, and a second referenced information management unit 9068. The second data storing unit 9063 stores a second correspondence relationship in which the identification information and the rendered variable data are associated with each other. The second data management unit 9066 manages the second correspondence relationship based on a predetermined management scheme. The second referenced information management unit 9068 manages the referenced information in the second correspondence relationship.

Since a flow of printing is the same as the flow of the process described with reference to FIGS. 4 and 5 in the first embodiment, description thereof will be omitted in the present embodiment. Further, a structure of the data used in the present embodiment is the same as that in the first embodiment, but an element for storing JobID is added to the node and the sequence.

FIGS. 15A to 16C are diagrams illustrating a transition of data and related data stored in the first data storing unit 9042 and the second data storing unit 9063 when the printing system 9000 sequentially acquires the variable data.

The tables in FIG. 15A represent variable data 2010 input to the printing system 9000, the search start node pointer, a node, the data specifying information, the sequence deletion number, the sequence, and the rendered variable data corresponding to the identification information sequentially from left. The tables of FIGS. 15B to 16C are arranged in the same way as those of FIG. 15A.

FIGS. 15A to 16C illustrate a transition when images A.jpg, B.jpg, C.jpg, A.jpg, D.jpg, and A.jpg have been sequentially requested as the variable data 2010. Although this was not specifically set in the first and second embodiments, jobs input to the printing system are assumed to be sequentially input in the present embodiment.

The transition of FIGS. 15A to 16A is the same as the transition illustrated in FIGS. 8A to 9B. However, an ID of the job is stored in each JobID of the node and the sequence. Further, in the present embodiment, the first data management unit 9047 determines whether there is data stored in the node over three or more jobs by referring to JobID each time the first correspondence relationship is updated.

FIG. 16B illustrates a case in which D.jpg has been subsequently requested as the variable data. The search start node pointer is updated to point to a node that stores oldest data. Here, since the search start node pointer points to node B, node B is searched first. Since D.jpg is not found even after searching all nodes, a character string D.jpg is stored in node B to which the search start node pointer points, and the search start node pointer proceeds by one node and points to node C. The character string D.jpg is stored in the data specifying information, and the data specifying information is output. The rendering unit 9002 acquires the data specifying information, determines that there is no corresponding rendered variable data in the sequence since the character string is contained, and renders an image D.jpg. The rendering unit 9002 stores an address of the rendered variable data in the sequence. However, when the values are contained in all of the elements of the sequence as illustrated in FIG. 16B, content of the element corresponding to the sequence deletion number is rewritten to a new address, and the sequence deletion number increases by 1. Here, since the sequence deletion number is 2, content of the sequence element 2 is rewritten to the address of RD.dat that is rendered variable data of D.jpg, and the sequence deletion number is updated to 3.

FIG. 16C illustrates a case in which A.jpg has been subsequently requested as the variable data. Since the search start node pointer points to node C, node C is searched first. Since A.jpg is stored in node A, JobID is rewritten to J6, and identification information 1 is stored in the data specifying information. Further, it is determined whether data from three jobs earlier is contained by referring to JobID of the node. When the data from three jobs earlier is contained, data of the node is deleted. Further, with the deletion of the data of the node, the search start node pointer is updated to point to the node that stores the oldest data by referring to JobID. The rendering unit 9002 acquires the data specifying information, and acquires the rendered variable data corresponding to the identification information (in this case, 1) stored in the data specifying information. Similar to the data generation unit, the rendering unit 9002 determines whether data from three jobs earlier is contained by referring to JobID and deletes data of the corresponding element. Accordingly, the sequence deletion number is updated to point to the oldest data by referring to JobID.

As described above, according to the present embodiment, the same effects as those of the first embodiment are achieved. Further, according to the present embodiment, data not referred to when a predetermined number of jobs have passed is deleted, and thus data not referred to during the predetermined number of jobs is not stored in a memory. Accordingly, it is possible to prevent highly sensitive data from leaking.

While the operator terminal was a smart device in each embodiment, the present invention is not limited thereto. The operator terminal may be a computer such as a desktop PC or a laptop PC or may be any computer in which information regarding a task can be input and output.

Further, while the print target identification information was a bar code, the present invention is not limited thereto, and the print target identification information may be a two-dimensional code or a hologram, or may be any identification information through which printed materials can be identified. Further, a forming method thereof is also not limited to printing, and an IC chip or an RFID may be affixed or embedded and may also be cut or engraved in a predetermined shape.

Further, while the print target identification information acquisition device is a bar code reader, an image acquisition device is appropriate if the print target identification information is a two-dimensional code. Further, if the print target identification information is a hologram, an IC chip, or an RFID, a hologram reading device, an IC chip reader, or an RFID reader is appropriate. Further, the print target identification information acquisition device may be any device capable of acquiring the print target identification information associated with the printed material.

Further, while the data generation unit and the rendering unit operate on different hardware, the data generation unit and the rendering unit may operate on different virtual servers. Specifically, any configuration in which CPU resources are independent and CPU resources that can be used for a process of one of the data generation unit and the rendering unit are not affected even when a processing load of the other of the data generation unit and the rendering unit increases may be adopted.

Further, the information processing system according to the present invention may be applied to a system including a plurality of devices (for example, a host computer, an interface device, a reader, and a printer) or may be applied to an apparatus including one device (for example, a copying machine, a facsimile device, or the like).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-249046, filed Dec. 9, 2014, which is hereby incorporated by reference wherein in its entirety.

What is claimed is:

1. An information processing system comprising:
a first apparatus having at least one first processor and at least one first memory coupled to the at least one first processor; and
a second apparatus having at least one second processor and at least one second memory coupled to the at least one second processor,
wherein the at least one first memory has first instructions stored thereon which, when executed by the at least one first processor, cause the first apparatus to:
manage first management information for identifying objects whose rendered data has been stored in the at least one second memory,
determine whether or not rendered data of a current object has been stored in the at least one second memory, based on the first management information, and
instruct the second apparatus to acquire the rendered data of the current object being stored in the at least one second memory, if a determination is made that the rendered data of the current object has been stored in the at least one second memory, and
wherein the at least one second memory has second instructions stored thereon which, when executed by the at least one second processor, cause the second apparatus to:
manage second management information for identifying rendered data of the objects being stored in the at least one second memory, and
acquire the rendered data of the current object being stored in the at least one second memory by using the second management information according to the instruction,
wherein the first management information and the second management information are updated so that the rendered data of the objects which are identified by the first management information is identified by the second management information.

2. The information processing system according to claim 1,
wherein the first instructions, when executed by the at least one first processor, further cause the first apparatus to instruct the second apparatus to perform rendering of the current object, if a determination is not made that the rendered data of the current object has been stored in the at least one second memory, and
wherein the second instructions, when executed by the at least one second processor, further cause the second apparatus to acquire rendered data of the current object by performing rendering of the current object without using the second management information, according to the instruction for performing the rendering of the current object.

3. The information processing system according to claim 1,
   wherein the
      second management information associates a memory address of the memory where the rendered data has been stored with an object identifier managed in the first management information, and
   wherein the first instructions, when executed by the at least one first processor, further cause the first apparatus to:
      instruct the second apparatus to acquire the rendered data of the current object being stored in the memory by transmitting an object identifier of the current object, and
      acquire the rendered data of the current object from the at least one second memory based on the memory address obtained by referring to the second management information using the transmitted object identifier.

4. The information processing system according to claim 1,
   wherein the first instructions, when executed by the at least one first processor, and the second instructions, when executed by the at least one second processor, further cause the first apparatus and the second apparatus, respectively, to discard, when updating the first management information and the second management information, first information that is stored first.

5. The information processing system according to claim 1,
   wherein the first instructions, when executed by the at least one first processor, and the second instructions, when executed by the at least one second processor, further cause the first apparatus and the second apparatus, respectively, to store the number of searches, and discard information having a small number of searches first when updating the first management information and the second management information.

6. The information processing system according to claim 1,
   wherein the first instructions, when executed by the at least one first processor, and the second instructions, when executed by the at least one second processor, further cause the first apparatus and the second apparatus, respectively, to store job information when storing the first management information and the second management information, and discard information for which the most time has elapsed after storage in the first management information and second management information first based on the job information when updating the first management information and the second management information.

7. The information processing system according to claim 1,
   wherein the at least one first memory has first instructions stored thereon which, when executed by the at least one first processor, cause the first apparatus to
      manage, as the first management information, a predetermined number of identifiers for identifying objects whose rendered data is stored in the at least one second memory, and
      determine whether or not the rendered data of the current object is stored in the at least one second memory, based on whether or not an identifier of the current object is managed in the first management information,
   wherein the at least one second memory has instructions stored thereon which, when executed by the at least one second processor, cause the second apparatus to:
      manage, as the second management information, the predetermined number of identifiers for identifying rendered data of the objects stored in the at least one second memory; and
   wherein the first management information and the second management information are updated so that the rendered data of the objects which are identified by the predetermined number of identifiers managed as the first management information is identified by the predetermined number of identifiers managed as the second management information.

8. The information processing system according to claim 7,
   wherein the at least one first memory has first instructions stored thereon which, when executed by the at least one first processor, cause the first apparatus to:
      instruct, if the a determination is made that the rendered data of the current object is stored in the at least one second memory, the second apparatus to acquire the rendered data of the current object stored in the at least one second memory, by transmitting an identifier corresponding to the current object managed in the second management information, and
   wherein the at least one second memory has instructions stored thereon which, when executed by the at least one second processor, cause the second apparatus to:
      acquire the rendered data of the current object stored in the at least one memory by using the transmitted identifier.

9. A printing system that processes current data to be rendered, comprising:
   a first apparatus configured to generate information, the first apparatus including at least one first processor and at least one first memory coupled to the at least one first processor; and
   a second apparatus configured to generate print data, the second apparatus including a temporary storing unit, at least one second processor, and at least one second memory coupled to the at least one second processor,
   wherein the at least one first memory has instructions stored thereon which, when executed by the at least one first processor, cause the first apparatus to:
      manage management information for identifying rendered data, which has been stored in the temporary storing unit, and
      transmit to the second apparatus, as data specifying information, first type information for the current data if the management information identifies that rendered data for the current data has been stored in the temporary storing unit, and transmit to the second apparatus second type information for the current data if the management information does not identify that the rendered data for the current data has been stored in the temporary storing unit, and
   wherein the at least one second memory has instructions stored thereon which, when executed by the at least one second processor, cause the second apparatus to:
      receive the transmitted data specifying information,
      utilize the rendered data for the current data, which has been stored in the temporary storing unit, to generate print data if the received data specifying information is the first type information, and render the current data to generate print data if the received data specifying information is the second type information, and perform printing based on the generated print data.

10. The printing system according to claim 9, wherein the management information is a first table including each name of data associated with a different identifier, wherein the at least one first memory has instructions stored thereon which, when executed by the at least one first processor, cause the first apparatus to:

transmit the identifier associated with the name of data that is the same as a name of the current data, as the first type information, if the first table includes a name of the current data, and transmit the name of the current data, as the second type information, if the first table does not include the name of the current data, wherein the at least one second memory has instructions stored thereon which, when executed by the at least one second processor, cause the second apparatus to:

manage a second table that includes each identifier of rendered data being stored in the temporary storing unit, the identifier being associated with a location of the rendered data being stored in the temporary storing unit, and obtain the rendered data from the location associated with the identifier that is the same as the transmitted identifier by use of the second table to utilize the rendered data if the received data specifying information is the identifier transmitted as the first type information, and render the current data if the received data specifying information is the name of the current data transmitted as the second type information.

* * * * *